US006398181B1

(12) United States Patent
Dettmers et al.

(10) Patent No.: US 6,398,181 B1
(45) Date of Patent: Jun. 4, 2002

(54) VALVE ARRANGEMENT

(75) Inventors: Michael Dettmers, Kamen; Wolfgang Kobow, Wuppertal; Werner Reinelt, Bochum, all of (DE)

(73) Assignee: DBT Deutsche Bergbau-Technik GmbH (DE)

( * ) Notice: Subject to any disclaimer, the term of this patent is extended or adjusted under 35 U.S.C. 154(b) by 0 days.

(21) Appl. No.: 09/460,788

(22) Filed: Dec. 14, 1999

(30) Foreign Application Priority Data

Dec. 15, 1998 (DE) ........................................ 198 57 890

(51) Int. Cl.[7] ................................................ F16K 31/12
(52) U.S. Cl. .............................. 251/29; 251/25; 251/26
(58) Field of Search ............................... 251/26, 29, 25

(56) References Cited

U.S. PATENT DOCUMENTS

| | | | | |
|---|---|---|---|---|
| 3,568,775 A | * 3/1971 | Greenberg | .................... | 169/20 |
| 4,452,269 A | * 6/1984 | Kindermann | ............... | 137/338 |
| 4,452,422 A | * 6/1984 | Trassl | .......................... | 251/25 |
| 4,500,066 A | * 2/1985 | Trassl | .......................... | 251/26 |
| 5,067,522 A | * 11/1991 | Ligh | .......................... | 251/282 |
| 5,577,532 A | * 11/1996 | Palmer | ....................... | 137/460 |
| 5,758,862 A | * 6/1998 | Sturman | ....................... | 251/25 |
| 6,053,202 A | * 4/2000 | Cunningham | ................ | 251/26 |
| 6,129,002 A | * 10/2000 | Lisec et al. | ............ | 251/129.17 |

* cited by examiner

*Primary Examiner*—Philippe Derakshani
*Assistant Examiner*—David A Bonderer
(74) *Attorney, Agent, or Firm*—Cook, Alex, McFarron, Manzo, Cummings & Mehler, Ltd.

(57) ABSTRACT

A valve arrangement (10) for hydraulically actuated machinery installations, especially for powered support assemblies in underground mining, with hydraulically actuated working valves (12, 13, 14) to control hydraulic cylinders (11) or other hydraulically actuated machinery units of the machinery installation and with pilot valves (15) controlling the working valves. In order to avoid the pilot valves (15) and working valves (12, 13, 14) entering an unstable operating condition in the event of a falling off of pressure in the hydraulic fluid supply to the valves, and opening and closing in an uncontrollable and undesired manner, the pilot valves (15) are attached to their own pressure medium supply (17), separate or separable from the hydraulic fluid supply (20) to the working valves (12, 13, 14), so that pressure variations in the hydraulic fluid supply circuit do not affect the pressure medium for the switching of the working valves (12, 13, 14), but the pressure in them is maintained largely constant.

9 Claims, 1 Drawing Sheet

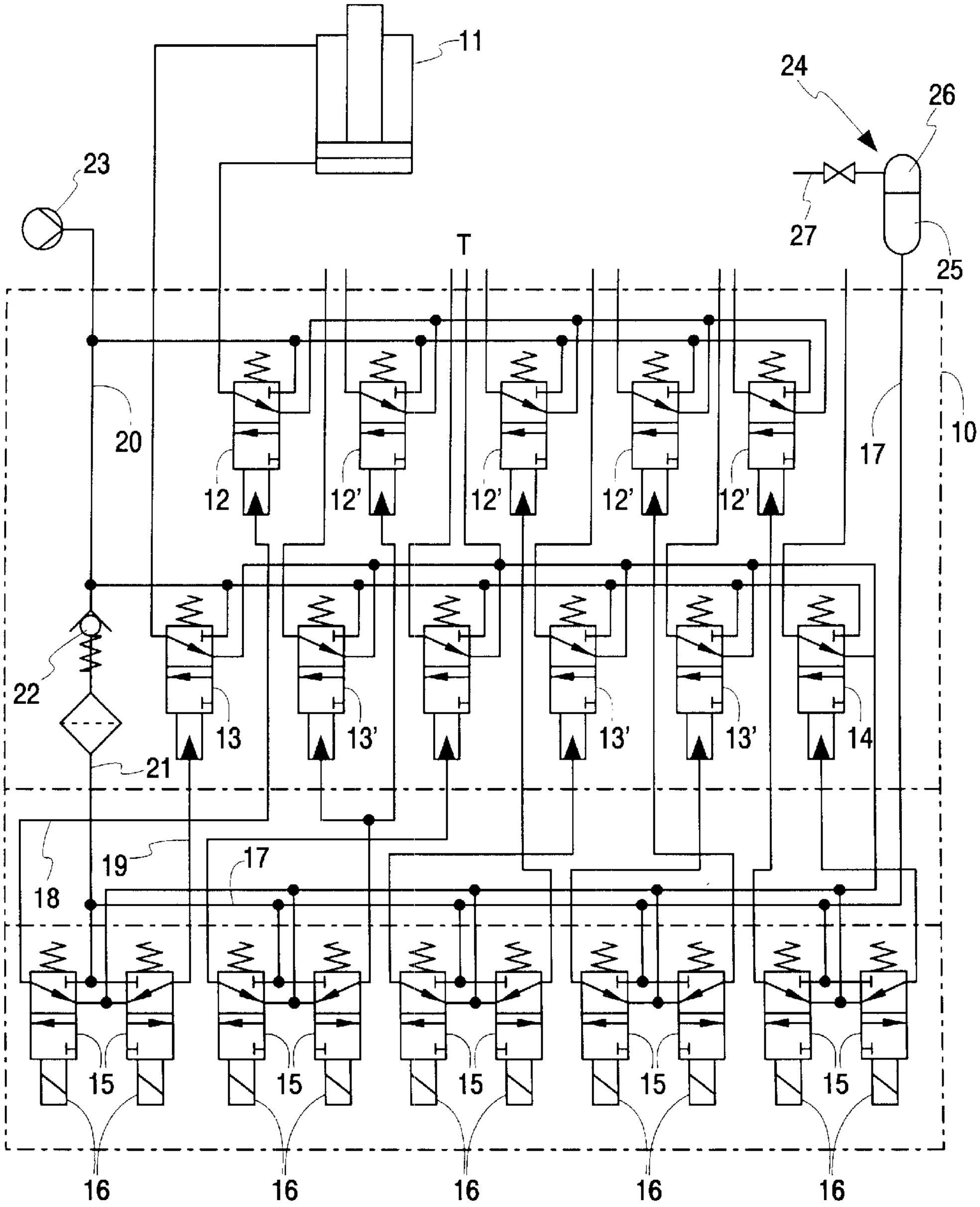
11
23
24
26
27
25
T
20
10
17
12
12'
12'
12'
12'
22
13
13'
13'
13'
14
21
18
19
17
15
15
15
15
15
16
16
16
16
16

VALVE ARRANGEMENT

The present invention relates to a valve arrangement for hydraulically actuated machinery installations in mining, especially for powered support assemblies in underground mining, with one or more hydraulically actuated working valves for controlling one or more hydraulically actuated machine units of the machinery installation and with at least one electro-hydraulic pilot valve assigned to the working valve or valves, controlling it or them.

Valve arrangements of this construction have many different areas of application in underground mining, for instance for the control of hydraulic cylinders in powered support assemblies, which in the continuously advancing mining of the face have to be regularly withdrawn, traversed and reset. The supply and withdrawal of the hydraulic fluid to the extending and withdrawing hydraulic cylinders is controlled by the working valves, which in turn are have to be switched by the pilot valves, since the power required to switch the working valves cannot be applied by the electro-magnets driven within the intrinsically safe power region, which are only permitted for application in underground mining.

The switching of the working valves is effected thereby by means of the high pressure hydraulic fluid itself. In the known valve circuits the arrangement is chosen such that the electro-hydraulic pilot valves are connected to the same hydraulic fluid supply as the large users, the normally applied three—two—way valves, and are thus subject to the same pumping pressure made available by the hydraulic fluid pumps. This known arrangement has operated reliably in most machine installations for the control of their hydraulic units. However in large users, for instance in very large powered support assemblies, which are designed for a high loading and are provided with correspondingly large props and cylinders, it can arise that a large amount of hydraulic fluid is required within a short time, for instance when several users have to be controlled simultaneously, which has the consequence that the pressure in the high pressure system delivering hydraulic fluid falls significantly. This has in turn the consequence that the pilot valves begin to flutter due to varying or too little hydraulic pressure, this means that their desired position is not continuously maintained, but they travel open and shut, whereby the working valves also are not maintained in the required switching position and thereby an even effect is not provided on the loads controlled by them.

It is an aim of the present invention to overcome the aforementioned disadvantage and to produce a valve arrangement of the construction described above, with which uneven operation of the valves, that is their fluttering, is reliably overcome, so that an even actuation of the hydraulically operable machine units, especially a smooth in and out movement of the prop and the cylinders is provided.

Accordingly the present invention is directed to a valve arrangement as described in the opening paragraph of the present specification in which a dedicated pressure medium supply, separated or separable from the hydraulic fluid supply of the working valve or valves is attached to the pilot valve or valves.

In accordance with the invention, the pilot valves thus have their own pressure medium supply, which can be connected to the hydraulic fluid supply for the working valves, but which can however in need be separable from this or even fully independent of it. Pressure changes in the hydraulic fluid supply for the working valves do not therefore have an effect on the pressure medium supply for the pilot valves, but a largely constant hydraulic fluid pressure acts on them, so that it is ensured that the pilot valves do not, as a result of falling off of pressure in the hydraulic fluid supply to the working valves, come into the unstable operating condition described above, but retain the desired valve setting over the whole desired time period. It is thereby ensured that even under strong pressure variations in the hydraulic fluid system, the working valves are retained in their desired open or closed setting, so that the hydraulic fluid is continuously fed to the appropriate machine units.

Advantageously a pressure storage device is attached to the pressure medium supply for the pilot valve or valves. The pressure storage device can comprise a simple hydraulic tube, in which a part of the pressure medium of the pressure medium supply is stored and, due to the at least minimal available compressibility of the hydraulic tube, tube, forms a sort of pressure buffer, which ensures an even pressure in the whole pressure medium supply system. Especially the pressure storage device comprises a pressure equalising container.

In a preferred embodiment the pressure storage device has a gas-filled pressure bubble. Due to the essentially higher compressibility of the gas ensures an especially good pressure equalisation and itself ensures an almost unchanging pressure in the pressure medium supply circuit, when all the pilot valves are operated simultaneously and the volume of the pressure medium system thereby measurably changes.

The gas filling of the pressure bubble comprises advantageously an inert gas, advantageously nitrogen, so that it is ensured that no inflammable gas mixture can form within the pressure storage device.

Preferably the pressure medium supply for the pilot valve is, or can be, connected to the hydraulic fluid supply for the working valve or valves with a stop valve connected between them. In this development the required hydraulic pressure for the pilot valve or valves is built up in a similar manner as in previously proposed valve arrangements, as long as the high pressure required for this is available in the hydraulic fluid supply for the working valves. The cut off valve ensures that a falling off of pressure in the hydraulic fluid supply for the working valves has no influence on the pressure medium supply for the pilot valves, since with the cut off valve shut, the two fluid systems are without any connection to each other. In a preferred embodiment the stop valve is configured as a non-return valve. Thus automatically separating the pressure medium system for the pilot valves from the remaining hydraulic fluid supply, when a falling off of pressure occurs in the latter. On the other hand, it is ensured by this arrangement, that the pressure in the pressure medium supply for the pilot valves is always at least as high as the pressure in the rest of the hydraulic system.

An example of a valve arrangement made in accordance with the present invention will be described below with regard to the attached drawing the only FIGURE of which shows a powered face support assembly in a schematic hydraulic circuit plan.

In the FIGURE the overall valve arrangement 10 serves to control the hydraulic cylinders present in an advancing powered support assembly, with whose help the support assembly can be, in operation, withdrawn, traversed and reset again, whereby the cylinders can be moved in and out over a large distance, so as to provide adjustment of the powered support assembly to the changing mining conditions as the face progresses.

BRIEF DESCRIPTION OF THE DRAWINGS

FIG. 1 shows the preferred embodiment of the invention.

For reasons of easier representation, in the FIGURE only one hydraulic cylinder 11 of a powered support frame is schematically represented, which is controlled by two working valves 12, 13. The working valves 12', 13' also shown in the drawing are for the control of further hydraulic cylinders in the support frame and work together in pairs for this purpose in a similar manner to the working valves 12, 13. An additional, independently operating, valve 14 serves to release or to close water spray nozzles on the support frame in a known manner.

All the working valves 12 to 14 are hydraulically controlled in a known manner, for which purpose the valve arrangement has several electro-hydraulic pilot valves 15, whose electromagnets are operated in the intrinsically safe electrical power range, as is prescribed for machinery used for underground mining.

The pilot valves 15 are allocated to a pressure medium supply 17, which provides the necessary hydraulic fluid to operate the working valves 12, 13, 14. By operating the pilot valves 15 out of their depicted rest position into their working condition the working pressure acting in the pressure medium supply 17 is applied via the lines 18, 19 to the operating rods of the working valves 12 to 14, so that these are also operated and the hydraulic fluid of a hydraulic fluid supply 20 can flow into or out of the working cavity of the one or more hydraulic cylinders 11.

In accordance with the invention the pressure medium supply 17 for the pilot valves 15 is decoupled or separable from the hydraulic fluid supply 20 for the working valves 12 to 14, to which end a non-return valve 22 is coupled into a connecting line 21 between the two fluid systems. The arrangement is thereby designed such that the hydraulic pressure built up by a hydraulic pump 23 in the hydraulic fluid supply 20 is also available via the, then open, non-return valve 22 in the pressure medium supply 17. However as soon as a fall in pressure arises in the hydraulic fluid supply 20 for the working valves 12–14, the non-return valve 20 closes, so that the working pressure acting in the pressure medium supply 17 for the pilot valves 15 does not sink with the fluid pressure in the hydraulic fluid supply, but the hydraulic pressure previously generated by the hydraulic pump 23 remains largely retained. Because of the largely constant pressure level in the pressure medium supply 17 for the pilot valves 15 it is ensured that they work in a stable operating condition, that is they do not open and close (flutter) in an undesirable and uncontrolled manner. Since due to the separation of the pressure medium supply 17 for the pilot valves 15 from the hydraulic fluid circuit 20 for the operation of the loads (hydraulic cylinders 11) a largely constant working pressure of hydraulic fluid applies on the pilot valves 15 and also on the working valves 12 to 14, the latter also remain securely held in their desired positions independently of the fluid pressure in the hydraulic fluid supply, so that the hydraulic cylinders 11 are always continuously pressurised and thus can travel in and out without hesitation.

In order to provide the most constant desired pressure in the pressure medium 17, this has a pressure storage device 24 assigned to it, which in the embodiment shown essentially comprises a pressure equalising container 25, which is filled partly with an inert gas, advantageously nitrogen, forming a pressure bubble 26. The gas bubble above the fluid level of the pressure fluid provides, due to the comparatively high compressibility of the gas in the pressure medium supply 17, a comparably constant fluid pressure, so that the pilot valves, with the aid of the pressure storage device and the non-return valve, operate satisfactorily even if several of them are operated simultaneously and then the pressure in the hydraulic fluid supply suddenly falls due to the simultaneous actuation of several loads.

As soon as the pressure in the hydraulic fluid supply rises again and reaches a value, which corresponds to the pressure in the pressure medium supply and its pressure storage device, the non-return valve is again released, so that the pressure level in both fluid circuit sectors again equalises.

The present invention is not limited to the embodiment described above, but there is a number of modifications and additions, which do not depart from the framework of the invention. It is thus for instance possible, to decouple the pressure medium supply for the pilot valves 15 from the hydraulic fluid supply for the working valves 12, 13, 14 entirely and to provide the necessary hydraulic pressure for actuating the working valves 12, 13, 14 via a separate hydraulic pumping device or a compressed air connection at the pressure equalising container 25, which is already indicated there at 27. Instead of the pressure equalising container 25 it is possible to use, as a simple pressure store to increase the volume of the pressure medium supply 17, a pressure hose which has itself a certain compressibility and therefore in any case ensures a sufficiently constant fluid pressure therein for the expected only small changes of volume in the pressure medium circuit when switching the valves.

What is claimed is:

1. A valve arrangement for hydraulically actuated machinery installations for powered support assemblies in underground mining, including one or more hydraulically actuated working valves for controlling one or more hydraulically actuated machine units of a machinery installation, at least one electro-hydraulic pilot valve assigned to said one or more hydraulically actuated working valves, said at least one electro-hydraulic pilot valve controlling said one or more hydraulically actuated working valves, and a dedicated pressure medium supply being separable from a hydraulic fluid supply of said one or more hydraulically actuated working valves wherein a valve is connected between the pressure medium supply and the hydraulic fluid supply and said pressure medium supply being attached to said at least one electro-hydraulic pilot valve.

2. A valve arrangement according to claim 1, in which a pressure storage device is attached to the pressure medium supply for said at least one electro-hydraulic pilot valve.

3. A valve arrangement according to claim 2, in which the pressure storage device comprises a pressure equalising container.

4. A valve arrangement according to claim 3, in which the pressure storage device has a gas-filled pressure bubble.

5. A valve arrangement according to claim 4, in which the gas filling of the pressure bubble comprises nitrogen.

6. A valve arrangement according to claim 1 wherein the valve is a stop valve which is connected between the pressure medium supply for said at least one electro-hydraulic pilot valve and the hydraulic fluid supply for said one or more hydraulically actuated working valves.

7. A valve arrangement according to claim 6, in which the stop valve is configured as a non-return valve.

8. A valve arrangement for hydraulically actuated machinery installations in mining including a plurality of hydraulically actuated working valves for controlling one or more hydraulically actuated machine units of a machinery installations, at least one electro-hydraulic pilot valve assigned to said plurality of hydraulically actuated working valves, said at least one electro-hydraulic pilot valve controlling said plurality of hydraulically actuated working valves, and a dedicated pressure medium supply separable from a hydraulic fluid supply of said plurality of hydraulically actuated working valves wherein a valve is connected between the pressure medium supply and the hydraulic fluid supply and said pressure medium supply being attached to said at least one electro-hydraulic pilot valve.

9. A valve arrangement for hydraulically actuated machinery installations for powered support assemblies in underground mining including one or more hydraulically actuated working valves for controlling one or more hydraulically actuated machine units of a machinery installations, at least one electro-hydraulic pilot valve assigned to said one or more hydraulically actuated working valves, said at least one electro-hydraulic pilot valve controlling said one or more hydraulically actuated working valves, and a dedicated pressure medium supply being separable from a hydraulic fluid supply of said one or more hydraulically actuated working valves wherein a valve is connected between the pressure medium supply and the hydraulic fluid supply, said pressure medium supply maintaining a substantially constant pressure level for said at least one electro-hydraulic pilot valve and said pressure medium supply being attached to said at least one electro-hydraulic pilot valve.

* * * * *